(12) United States Patent
Bawcom et al.

(10) Patent No.: US 11,954,469 B2
(45) Date of Patent: Apr. 9, 2024

(54) BASES FOR PATTERN-BASED CLOUD COMPUTING

(71) Applicant: MCKINSEY & COMPANY, INC., New York, NY (US)

(72) Inventors: Aaron Bawcom, Atlanta, GA (US); Beau Bennett, Atlanta, GA (US); Sebastian Becerra, Atlanta, GA (US)

(73) Assignee: MCKINSEY & COMPANY, INC., New York, NY (US)

(*) Notice: Subject to any disclaimer, the term of this patent is extended or adjusted under 35 U.S.C. 154(b) by 0 days.

(21) Appl. No.: 17/838,945

(22) Filed: Jun. 13, 2022

(65) Prior Publication Data
US 2023/0401045 A1 Dec. 14, 2023

(51) Int. Cl.
*G06F 8/60* (2018.01)
*G06F 9/4401* (2018.01)

(52) U.S. Cl.
CPC .............. *G06F 8/60* (2013.01); *G06F 9/4401* (2013.01)

(58) Field of Classification Search
None
See application file for complete search history.

(56) References Cited

U.S. PATENT DOCUMENTS

| | | | |
|---|---|---|---|
| 2014/0149983 A1* | 5/2014 | Bonilla | G06F 3/0619 718/1 |
| 2021/0174280 A1* | 6/2021 | Ratnapuri | H04L 67/51 |
| 2022/0094744 A1* | 3/2022 | Jung | H04L 67/1097 |
| 2022/0300603 A1* | 9/2022 | Geiger | G06F 21/6209 |
| 2022/0308972 A1* | 9/2022 | Anand | G06Q 10/063112 |

OTHER PUBLICATIONS

Janakiram, "HashiCorp goes Multi-Cloud With A Fully Managed Cloud Platform", Jun. 24, 2020, Forbes (Year: 2020).*

* cited by examiner

*Primary Examiner* — Fahmida Rahman
(74) *Attorney, Agent, or Firm* — MARSHALL, GERSTEIN & BORUN LLP; Randall G. Rueth

(57) ABSTRACT

Systems and methods for providing a pattern-based cloud architecture facilitating deployment of pattern-based cloud applications are presented. The pattern-based cloud architecture may comprise a base layer having at least a primary base, with each base supporting one or more landing zones of a landing zone layer. Each landing zone further supports one or more application patterns for cloud applications in an application pattern layer. Implementing the base layer includes receiving a set of base services and operating parameters defining a primary base and executing scripts to configure the primary base for providing the set of base services and operating parameters to any landing zones associated with such primary base. A bootstrap isolation entity may be established prior to and for the purpose of executing the scripts to implement the primary base. Additional bases may be implemented in the base layer by executing additional scripts within the primary base layer.

17 Claims, 8 Drawing Sheets

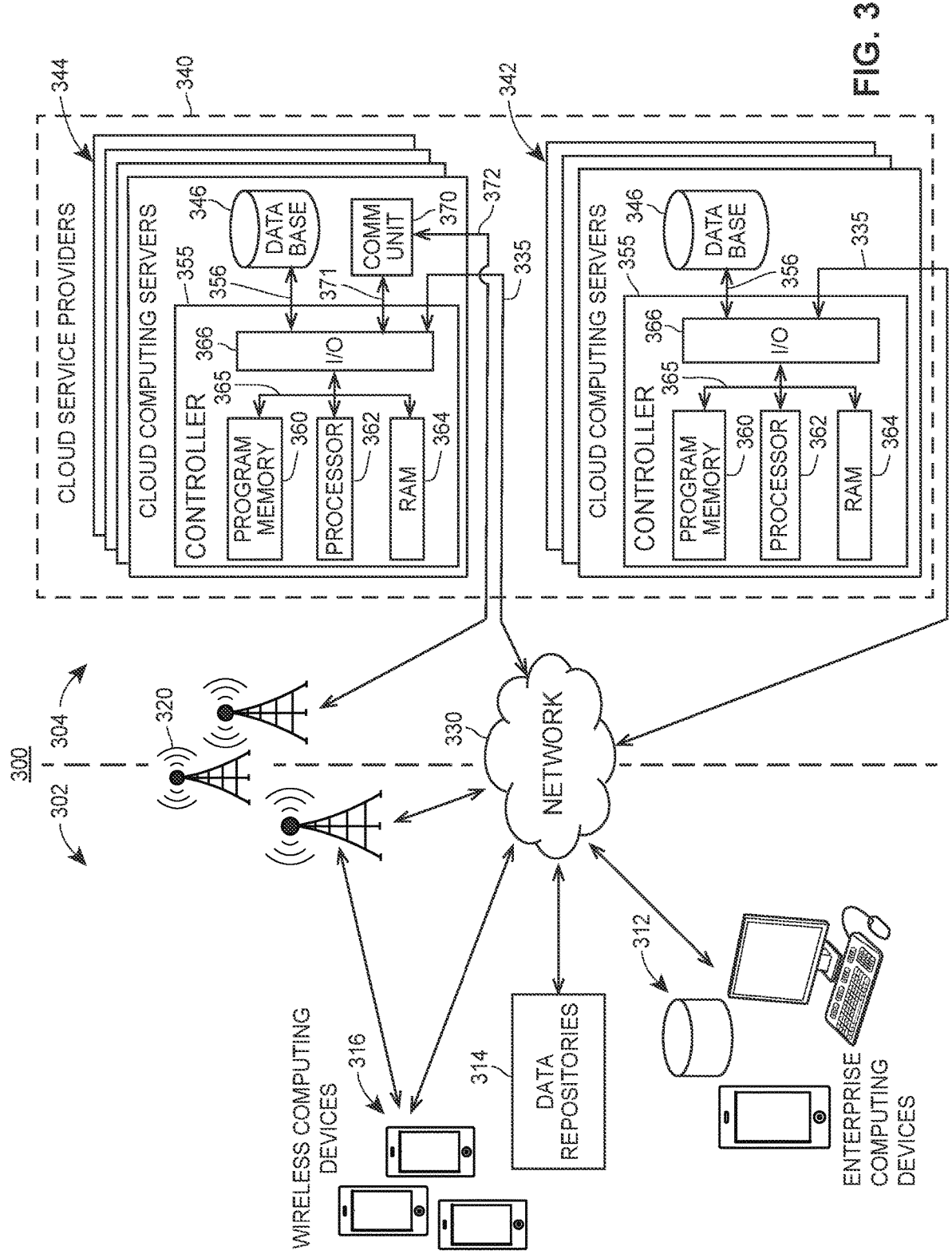

BASES FOR PATTERN-BASED CLOUD COMPUTING

FIELD OF THE DISCLOSURE

The present disclosure relates to cloud-based computing and more particularly to system software architecture supporting improvements in development and deployment of such applications.

BACKGROUND

The adoption of cloud computing has accelerated in recent years, with large and small organizations taking advantage of the scalability, low initial costs, security, and reliability offered by cloud service providers. Cloud service providers offer cloud computing resources to customers, including cloud platform services and cloud infrastructure services upon which customers can deploy and run software applications. With this recent expansion of cloud-based storage and processing, many applications and services have been developed for or migrated to the cloud. This has resulted in a proliferation of cloud-based applications, each needing separate configuration and management for its particular use. Such individualization is time-consuming for application developers and limits interoperability between applications and across platforms. With each cloud service provider using its own protocols, applications developed for one cloud service provider's requirements may not work with other cloud services. Additionally, such individualization of each platform and application reduces security by introducing additional attack points. Beyond initial development and configuration, maintaining and managing cloud software applications across numerous platforms, cloud environments, locations, and business units increases the number of opportunities for errors, incompatibilities, and security breaches.

Previous attempts to address such issues have been inadequate and have only succeeded in reducing the impact of these problems by significantly limiting the functionality and flexibility of cloud-based applications. For example, application blueprints have been used to restrict cloud-based applications to limited functions for specific fields of use, thus avoiding issues of complexity and interoperability by defining a narrow scope for a class of applications. However, such approach effectively locks the applications into a rigid set of allowed operations that serve a specific type of uses, thus requiring new blueprints for each new use case or functionality. Such solutions thus fail to obtain many of the advantages of cloud computing by sacrificing flexibility and functionality for simplicity. Improved cloud computing architecture and techniques are needed.

Additionally, because of the volume of software resources being migrated to the cloud, there is a corresponding effort to provide tools to assist teams involved in cloud migration. However, the scale and complexity of these migrations creates a considerable challenge for most enterprises. Further, current approaches and tools used for cloud-migration by DevOps teams and others are often cumbersome and inefficient for many users. As a result, even though cloud solutions such as Amazon Web Services (AWS) go to tremendous lengths to help enterprises transition to the cloud, the process can be unsuccessful. In fact, close to sixty percent of enterprises report stalled or failed cloud migrations. Accordingly, improvements in the software tools and processes used for cloud migration are needed.

Properly securing IT assets that run in cloud infrastructure is one of the largest reasons for stalled cloud deployments. There are several Infrastructure-as-Code (IaC) technologies that declaratively describe infrastructure, including but not limited to YAML or HCL-based configurations. There have been attempts to provide static pre-deployment analysis of IaC for security purposes using Policy as Code (PaC) based technologies. However, some of these approaches do not provide the level of abstractions needed to allow a user to specify many of the diverse forms of security specifications that can be used to secure infrastructure resources.

An enterprise-wide migration to the public cloud may involve thousands of workloads. As a result, the selection and prioritization of multiple software applications for migration to the cloud is a fundamental challenge faced by enterprises. Tools that provision and manage infrastructure allow an enterprise to specify the entire rollout of multiple applications on the cloud using IaC techniques. Today, with IaC, the infrastructure details are specified in a language and the code instructions defined in that language are then run by a tool. With the entire infrastructure and operational characteristics of an application stored as code in a source code repository, versioning, tracking and managing the infrastructure can be achieved with greater accuracy using fewer resources. However, current approaches require extensive training and experience to generate IaC. As a result, engineers must manually write the code instructions to specify the details of the infrastructure before the software resources are deployed to the cloud. Further, it is difficult to find engineers with the required skills.

Also, with IaC users may configure application patterns to define requirements for deploying software resources to the cloud. However, the format for application patterns is undefined, and users may include any number of operating parameters when configuring an application pattern. As a result, some users may not include the appropriate security specifications that can be used to secure infrastructure resources resulting in vulnerability issues, while others may include requirements which are too stringent and make cloud migration very difficult.

SUMMARY

The present invention solves problems relating to the development, deployment, and management of cloud computing environments and cloud-based applications. To provide both flexibility and consistency across cloud-based systems, the techniques disclosed herein provide a pattern-based cloud computing architecture that combines a base layer, a landing zone layer, and an application pattern layer. The disclosure herein generally relates to systems, methods, and non-transitory computer-readable media storing instructions for providing such a cloud-based architecture facilitating deployment of cloud-based software applications. The systems, methods, and instructions disclosed herein may be implemented by cloud servers, client computing devices connected to cloud servers, enterprise computing devices connected to a local network, or combinations thereof.

The techniques described herein may include a method for providing a base layer of a cloud-based architecture facilitating deployment of cloud-based software applications, comprising: receiving an indication of a set of base services and operating parameters for a primary base of the base layer, and executing one or more scripts to implement the primary base. The primary base is configured to provide the set of base services and operating parameters to each of one or more landing zones associated with the primary base.

Such base services and operating parameters are provided in order to partially configure the one or more landing zones as cloud computing environments, with the base services and operating parameters defining aspects of the cloud computing environments for running cloud-based software applications.

In some embodiments, the method may include establishing a bootstrap isolation entity prior to implementing the primary base. In such embodiments, the bootstrap isolation entity is a configured cloud computing environment implemented by cloud service provider according to protocols associated with the cloud service provider. Executing the one or more scripts to implement the primary base may then comprise executing the one or more scripts within the bootstrap isolation entity.

In further embodiments, the method may also implement a secondary base. Upon receiving an additional indication of an additional set of base services and operating parameters for a secondary base of the base layer, one or more additional scripts may be executed within the primary base to implement the secondary base as a separate isolation entity within the base layer according to the additional set of base services and operating parameters. In some such embodiments, the one or more additional scripts may implement the secondary base to provide the set of base services and operating parameters and the additional set of base services and operating parameters to each of one or more landing zones associated with the secondary base. In further such embodiments, such primary base and secondary base may be used to isolate development and production resources of the system. Thus, the primary base may be a production base configured for use as a live deployment environment for cloud-based software applications after development and testing, while the secondary base may be a development base configured for use as a development and testing environment for cloud-based software applications, with the additional set of base services and operating parameters including one or more testing services.

In still further embodiments, the method may be used to update landing zones through the primary base. Upon receiving an update indication of one or more changes to the base services or operating parameters of the primary base, one or more update scripts may be executed to change the base services or operating parameters of the primary base according to the update indication. The primary base is thus configured to provide an updated set of base services and operating parameters to each of the one or more landing zones associated with the primary base.

In various embodiments, the base services may comprise services enabling each of the one or more landing zones to perform one or more of the following: monitoring landing zone performance, logging application operations, providing data security, providing shared services, or providing data resiliency. Similarly, the operating parameters may define functional or service level requirements of the cloud computing environments of the one or more landing zones regarding one or more of the following: security, compliance, authentication, authorization, or data access. Likewise, the indication of the set of base services and operating parameters may comprise a user selection of one or more predefined infrastructure libraries defining such or other services or operating parameters.

In some embodiments, the method may additionally receive one or more indications of landing zone services and landing zone operating parameters associated with each of the one or more landing zones, then execute a plurality of scripts to implement the one or more landing zones as the cloud computing environments according to the base services and operating parameters of the primary base and the landing zone services and landing zone operating parameters associated with each respective landing zone.

Systems or computer-readable media storing instructions for implementing all or part of the methods described above may also be provided in some aspects. Such systems or computer-readable media may include executable instructions to cause one or more processors to implement part or all of the methods described above. Additional or alternative features described herein below may be included in some aspects.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

FIG. 3 illustrates a block diagram of an exemplary cloud computing system showing hardware components and communication connections.

DETAILED DESCRIPTION

The systems, methods, and techniques described herein solve various problems relating to security, compatibility, flexibility, and reusability in the design, development, deployment, and management of cloud computing environments and cloud-based software applications. To obtain the benefits of consistency across environments as well as the benefits of flexible design, the techniques disclosed herein describe a pattern-based cloud architecture that may be implemented in conjunction with pattern-based cloud software applications. Unlike existing techniques, the pattern-based cloud architecture provides a plurality of landing zones comprising cloud computing environments that are defined by a combination of landing zone services and/or operating parameters, as well as base services and/or operating parameters inherited from the base with which each landing zone is associated. Additional, fewer, or alternative aspects may be included in various embodiments, as described herein.

Figure 1:
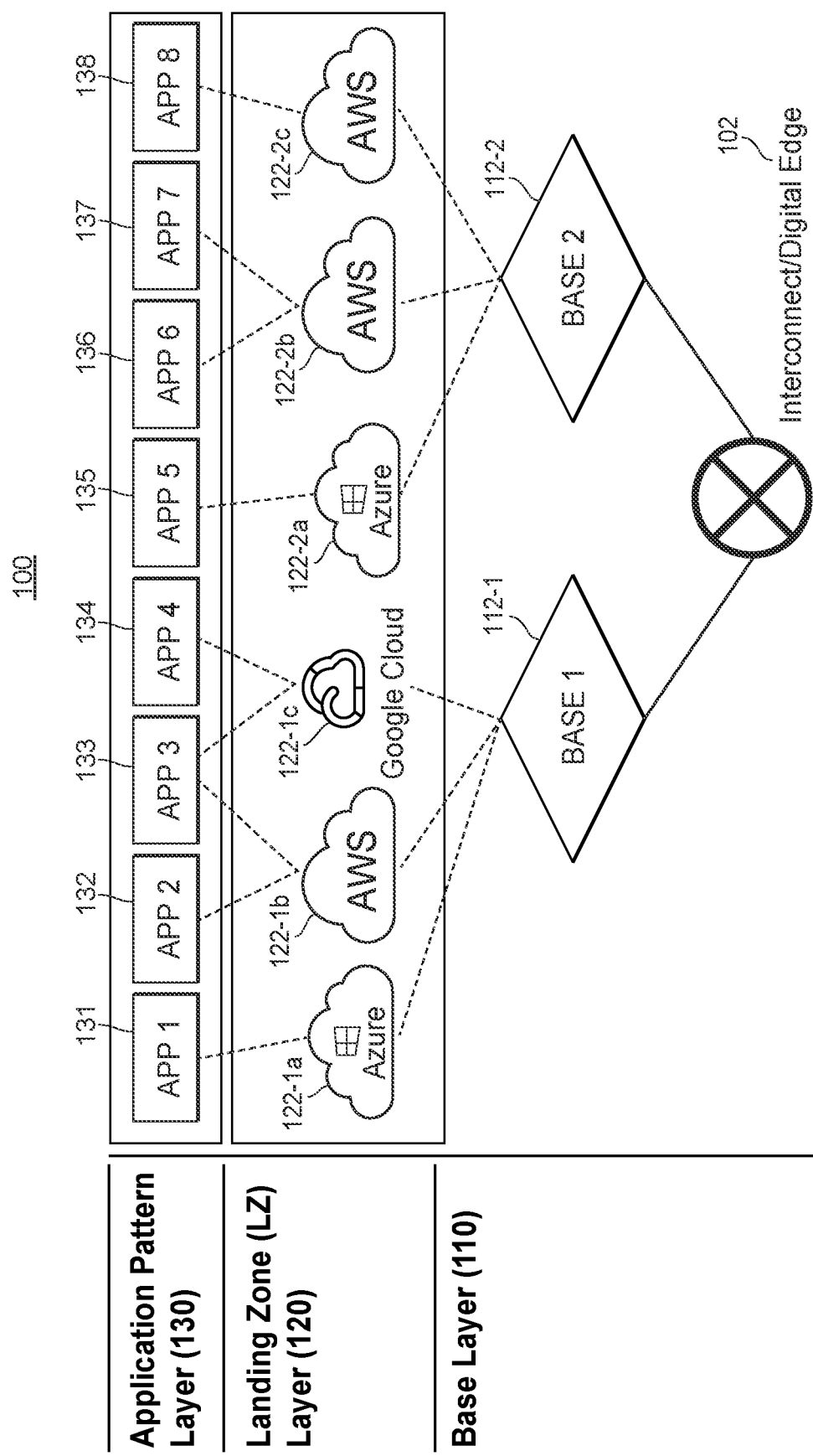
FIG. 1 illustrates a block diagram of an exemplary pattern-based cloud architecture showing layer hierarchy.

FIG. 1 illustrates a block diagram of an exemplary pattern-based cloud architecture 100 showing layer hierarchy for deploying a multi-layer cloud infrastructure. The example architecture 100 may be implemented across multiple networks at multiple locations (e.g., commercial cloud service providers, private clouds, or local area networks), while maintaining both separation of individual components and common configuration among related components within the architecture. A plurality of pattern-based applications may be deployed as cloud-based software applications configured to run in cloud computing environments. Such pattern-based applications must conform to corresponding application patterns 131-138 of the application pattern layer 130 to provide data management and analysis functionality or perform other operations by running within corresponding cloud environments defined by the corresponding landing zones 122 of the landing zone layer 120. The landing zones 122 define constraints and capabilities available to the applications according to the application patterns 131-138 by defining the operating environment for the execution of application instructions. Each of the landing zones 122 is defined in part by a corresponding base 112 of the base layer 110, which also provides certain base services and defines constraints for all the landing zones 122 based thereupon. The landing zones 112 further provide connectivity to the interconnect 102 (or digital edge) of the pattern-based cloud architecture 100, thereby providing access to other network assets (e.g., computing devices, data repositories, data streams, or other data sources or data consumers).

As illustrated in the example embodiment of FIG. 1, the pattern-based cloud architecture 100 comprises two bases 112 in the base layer 110. The first base 112-1 supports landing zones 122-1a, 122-1b, and 122-1c with a first set of operating parameters and base services, while the second base 112-2 supports landing zones 122-2a, 122-2b, and 122-2c with a second set of operating parameters and base services. As discussed further herein, the operating parameters partially define the functional or service level requirements of the cloud environments implemented as the corresponding landing zones 122. Similarly, the base services provide network connection and other common services to the landing zones 122 and, through them, the pattern-based applications. Each of the bases 112 thus provides fundamental services and defines common constraints for all the corresponding cloud computing environments that are associated with such base 112. This produces several advantages, including standardization of the cloud computing environments (and thus of the applications running therein), efficiency in updating or reconfiguring multiple cloud computing environments (i.e., multiple landing zones 122) through changes to the corresponding base 112, isolation of cloud resources (e.g., by data type, software suite, or business unit), and integration of legacy applications with new applications within a common infrastructure. Although two bases 112 are illustrated in the base layer 110, the architecture described herein facilitates the addition, removal, and reconfiguration of any number of bases, thereby further improving the flexibility of the overall cloud-based system.

As further illustrated in the example embodiment, each of the six landing zones 122 is associated with one and only one of the bases 112, thereby inheriting the operating parameters and base services of the respective base 112. Thus, each of landing zones 122-1a, 122-1b, and 122-1c inherits part of its services and constraints from the first base 112-1, while each of landing zones 122-2a, 122-2b, and 122-2c inherits part of its services and constraints from the second base 112-2. Nonetheless, each landing zone 122 remains separate from each other landing zone 122, thereby isolating the data and operations within each of the landing zones 122. Accordingly, the landing zones 122 may be implemented as cloud computing environments by different cloud computing platforms (e.g., private or commercial cloud service providers using various protocols). For example, landing zones 122-1a and 122-2a may be Azure Web Apps cloud computing environments by Microsoft Corporation, while landing zones 122-1b, 122-2b, and 122-2c may be Amazon Web Services cloud computing environments by Amazon.com, Inc., and landing zone 122-1c may be a Google Cloud Platform cloud computing environment by Google LLC. Thus, each of the landing zones 122-1a, 122-1b, and 122-1c is a separate type of cloud environment (i.e., cloud computing environments provided by different cloud service providers having different protocols and/or features). The features or characteristics of the landing zones 122 associated with a particular base 112 may also differ, within the limits of the constraints imposed by the base 112. Thus, landing zone 122-2a is a different type of cloud environment, while landing zones 122-2b and 122-2c are cloud environments of the same type but differ in their characteristics. For example, landing zones 122-2b and 122-2c may be implemented by the same cloud service provider using the same protocols, but they may differ with respect to parameters, capabilities, access, restrictions, or features.

This structured flexibility of the base layer 110 and landing zone layer 120 produces further advantages, including improving efficiency of deploying and managing cloud environments through standardization of a subset of their characteristics through corresponding bases, enhancing stability and security through isolating separate instances of cloud environments having characteristics applicable to all applications running therein, and facilitating the development and deployment of pattern-based cloud applications that limit the variability of each application and reduce the time required for configuration or reconfiguration of each such application. Although three landing zones 122 are illustrated as being associated with each of the two bases 112, the architecture described herein facilitates the addition, removal, and reconfiguration of any number of landing zones for any number of bases, thereby further improving the flexibility of the overall cloud-based system.

The application pattern layer 130 comprises a plurality of application patterns 131-138 defining allowable capabilities of pattern-based cloud applications associated with the respective landing zones. Such pattern-based applications are each configured to run within or access one or more of the landing zones 122 via an interface defined by a corresponding application pattern 131-138. The pattern-based applications are illustrated below in FIG. 2. As illustrated in FIG. 1, the application patterns 131-138 may include a first application pattern 131 associated with landing zone 122-1a, a second application pattern 132 associated with landing zone 122-1b, a third application pattern 133 associated with landing zones 122-1b and 122-1c, a fourth application pattern 134 associated with landing zone 122-1c, a fifth application pattern 135 associated with landing zone 122-2a, a sixth application pattern 136 associated with landing zone 122-2b, a seventh application pattern 137 associated with landing zone 122-2b, and an eighth application pattern 138 associated with landing zone 122-2c. Thus, more than one application pattern may be associated with a landing zone. Additionally, some application patterns may be associated with more than one of the landing zones, such as the third application pattern 133, which is associated with landing zones 122-1b and 122-1c. Although eight application patterns 131-138 are shown, the architecture described herein facilitates the addition, removal, and reconfiguration of any number of application patterns.

Each application pattern 131-138 defines a set of characteristics required for pattern-based applications to be associated with the landing zones 120. The pattern-based applications may be cloud-native applications running in cloud environments implemented as the landing zones 122. In some embodiments, the pattern-based applications may be other software applications configured to communicate with cloud-based services for obtaining or processing data (e.g., software applications running on local computing hardware communicating with cloud-based applications or services running within the landing zones via external application programming interfaces (APIs)). Each pattern-based application is configured by virtue of its compliance with an application pattern 131-138 to assume certain services and operating parameters will be provided by the landing zone 122 associated with such application, part of which services and operating parameters will be inherited by the landing zone 122 from the corresponding base 112. Since the operating parameters and services of each pattern-based application must match those of its one or more associated landing zones 122, each such application is developed according to an application pattern 131-138 defining the types of landing zones with which it is compatible. This pattern matching enables the pattern-based applications to be developed in an efficient manner, while allowing flexibility of specific operating parameters and services through the association of pattern-based applications with specific landing zones 122 and their corresponding bases 112. In some instances, a single cloud-based software application may be developed once but deployed multiple times, with different instances being associated with different landing zones 122 in order to specify operating parameters (including data sources) through association with the landing zones 122. For example, the third application pattern 133 is associated with both landing zone 122-1b and landing zone 122-1c, thus allowing pattern-based applications complying with the requirements of the third application pattern 133 to be associated with (e.g., deployed within) either landing zone 122-1b or landing zone 122-1c.

Figure 2:
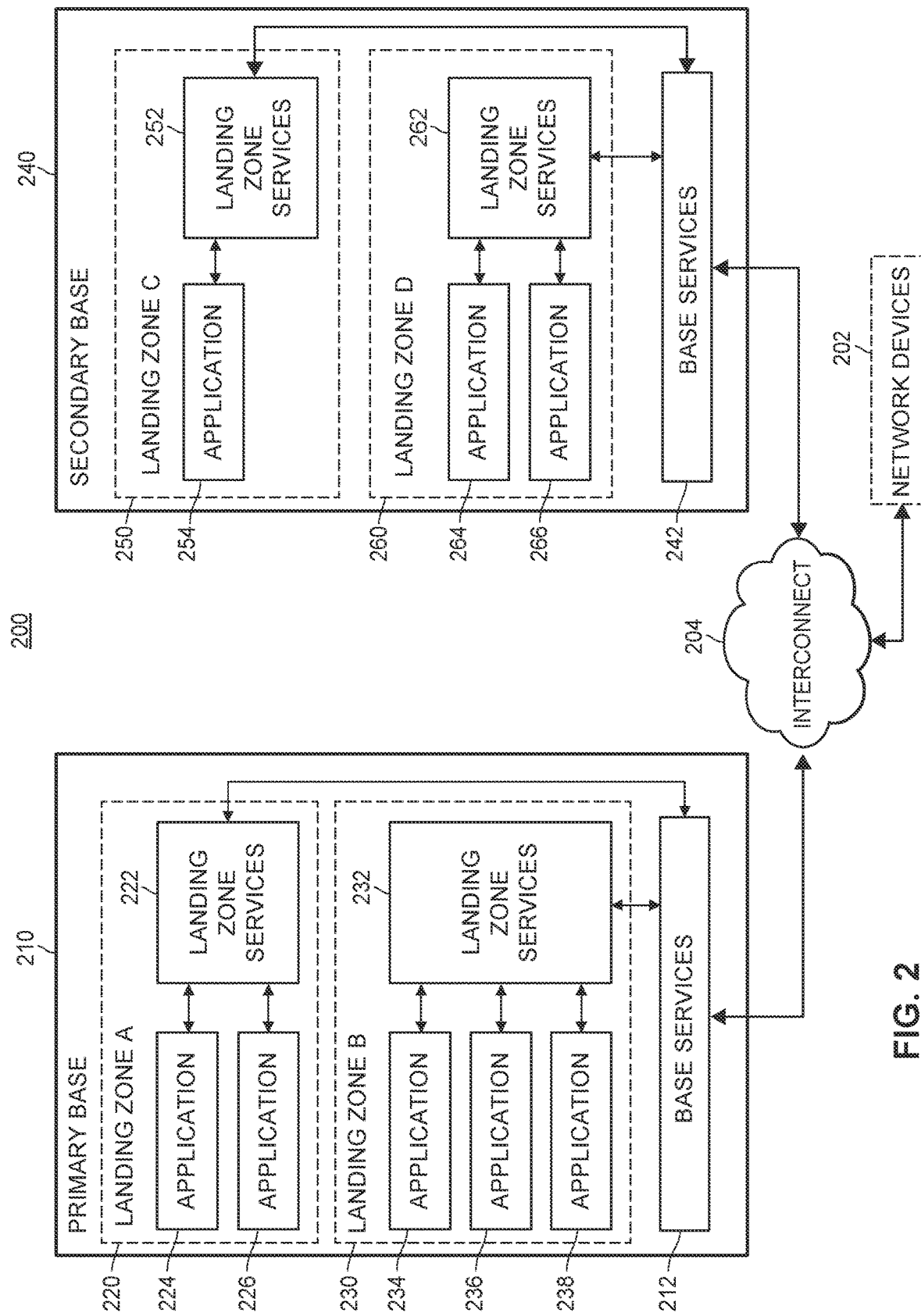
FIG. 2 illustrates a block diagram of an exemplary pattern-based cloud system showing isolation of software components using the pattern-based cloud architecture.

FIG. 2 illustrates a block diagram of an exemplary pattern-based cloud system 200 showing isolation of software components using the pattern-based cloud architecture described herein. As will be apparent, the example system 200 illustrates an alternative view and an alternative configuration of such pattern-based cloud architecture in order to emphasize the features and flexibility of such architecture. The example system 200 comprises software components implemented by hardware components, such as those described below with respect to FIG. 3. As shown, a primary base 210 and a secondary base 240 are connected via an interconnect 204 to network devices 202, which may provide data to and/or receive data from the primary and secondary bases 210 and 240. Such network devices 202 may thus include data repositories or data streams, as well as software applications running on hardware devices configured to communicate data via the interconnect 204 with the various cloud-based applications associated with the primary and secondary bases 210 and 240.

Each of the primary base 210 and the secondary base 240 comprises a plurality of landing zones, each of which is further associated with one or more cloud-based applications. Although both the primary base 210 and the secondary base 240 are connected via the interconnect 204 with the network devices 202, each of the bases may be configured to connect to a subset of the total network devices 202. In some such embodiments, the subsets may be partially or fully overlapping, such that some network devices 202 are connected to communicate with both bases 210 and 240. For example, the primary base 210 may be associated with a legacy system architecture corresponding to a first plurality of network assets of the network devices 202, while the secondary base 240 may be associated with an additional system architecture corresponding to a second plurality of network assets of the network devices 202. In such example, the legacy system architecture may be integrated with the additional system architecture into a common pattern-based cloud architecture without loss of data quality and without significant alteration to the legacy system.

As illustrated, each of the bases provides software services to all of its landing zones, while each of the landing zones further provides additional software services to any applications running within or accessing the landing zone. Thus, primary base 210 includes a plurality of base services 212, which are available to landing zone A 220 and landing zone B 230. The secondary base 240 likewise includes another plurality of base services 242, which are available to landing zone C 250 and landing zone D 260. The base services 212 and 242 may both include an identical set of services, or the base services 212 may differ in number, type, or configuration from the base services 242. Each of the bases 210 and 240 provides at least base services implementing network communication via the interconnect 204, thereby connecting to the network devices 202. Along with such communication services, other fundamental services for deploying, configuring, or managing landing zones 220, 230, 250, 260 may be included in the base services 212 and 242. Additionally, the base services 212 and 242 may further include any common services expected to be of use to all or most landing zones 220, 230, 250, 260. Without limitation, such common services may include services relating to monitoring landing zone performance, logging application operations, providing data security, providing or managing shared services across all landing zone instances, performing load balancing, managing software licenses, and/or providing resiliency for data and applications. In some embodiments, further services useful for particular data sets or cloud environments may be included in the base services 212 or 242 in order to ensure consistency in the services available across the applications of all the landing zones 220 and 230 of primary base 210 or landing zones 250 and 260 of the secondary base 240, respectively.

In addition to base services 212 and 242, the exemplary pattern-based cloud system 200 includes services specifically implemented for each landing zone. Thus, each landing zone 220, 230, 250, 260 has zone-specific services and services common to all landing zones in the same base. For example, landing zone A 220 provides the base services 212 and landing zone services 222 in order to support applications 224 and 226. Similarly, landing zone B provides the base services 212 and landing zone services 232 to applications 234, 236, 238. Thus, both landing zones A and B provide the same base services 212, in addition to providing different landing zone-specific services. The landing zones C and D of the secondary base 240 function similarly. Landing zone C 250 provides the base services 242 and landing zone services 252 in order to support application 254, and landing zone D 260 provides the base services 242 and landing zone services 262 in order to support applications 264 and 266.

The landing zone services expand upon the base services to provide additional functionality within the respective landing zones, thereby providing further standardization to the applications associated therewith. As illustrated, the base services 212 may be accessed by or incorporated into the landing zone services 222 and 232, and the base services 242 may be accessed by or included in the landing zone services 252 and 262. The landing zone services 222, 232, 252, 262 may include services relating to security, compliance, monitoring and logging, data access and storage, application management, virtualization or container management, or other functions of the corresponding cloud environments. As each landing zone 220, 230, 250, 260 implements a specifically configured cloud computing environment capable of supporting the various cloud-based applications associated therewith, the corresponding landing zone services 222, 232, 252, 262 may include any services necessary to fully implement such cloud environments in connection with any base services 212 or 242. In some embodiments, some or all of the landing zone services may include one or more services that are made available by the corresponding landing zones to applications running within or accessing such landing zones, as well as services performing necessary functions to run, secure, and monitor the landing zones.

In order to isolate each of the various landing zones 220, 230, 250, 260 from the other landing zones, the base services 212 and 242 may further implement virtual network services to establish separate virtual networks with each landing zone within the corresponding bases in some embodiments. For example, the base services 212 may establish a first virtual private network for communication with landing zone A 220 and a second virtual private network for communication with landing zone B 230. In further embodiments, the base services 212 and 242 may additionally or alternatively establish virtual network connections with network devices 202 via the interconnect 204. In some embodiments, the base services 212 and 242 may establish virtual networks through the respective landing zones to specific applications 224, 226, 234, 236, 238, 254, 264, 266. In further embodiments, the landing zones 220, 230, 250, 260 may establish separate virtual network connections for their respective applications in order to provide further separation of the applications within each landing zone. The implementation of such virtual networks improves security and control of the landing zones and applications, but such virtual networks are not required and may be omitted from some embodiments for convenience.

In addition to services, each of the bases and landing zones is configured according to operating parameters specifying environmental parameters or other variable constrains in order to configure the landing zones 220, 230, 250, 260 as cloud computing environments by establishing functional or non-functional requirements and limitations of such environments. The operating parameters may thus define performance or other aspects of the landing zones as cloud computing environments in running cloud-based software applications (e.g., the performance of landing zone A in running applications 224 and 226 as cloud-based applications within a virtual machine or an operating system of a cloud environment). Performance of the cloud computing environments may be considered in terms of functionality, resource availability, security, compliance, quality of service, or other aspects affecting the operation of the environments. In some embodiments, the operating parameters of a landing zone may include policies comprising rules to be enforced by the respective landing zone for all software applications running in such cloud computing environment, which rules may be related to one or more of the following: security, compliance, authentication, authorization, or data access.

The operating parameters may be partially defined by the bases 210 and 240, along with the base services 212 and 242. Additional landing zone-specific operating parameters may be further defined for each of the landing zones 220, 230, 250, 260, along with the respective landing zone services 222, 232, 252, 262. Such operating parameters may be set when each base or landing zone is initially deployed and may be updated at any time to adjust operation of the respective landing zones. In some embodiments, the operating parameters may be imported from infrastructure libraries of previously selected sets of operating parameters and services, which may be reused and combined in various combinations across different bases or landing zones. Such infrastructure libraries may also include services that may be incorporated into the base services or landing zone services when designing various bases and landing zones. The use of such infrastructure libraries thus improves consistency and reduces development time, while promoting flexibility in the combinations of operating parameters and services included in the various infrastructure library files.

As an example of the use of such a pattern-based cloud architecture 100 implemented by a system such as the pattern-based cloud system 200, enterprise logging, monitoring, and analytics (ELMA) functions may be implemented in an integrated manner using a pattern-based cloud architecture. Using current ELMA techniques, both the volume of data generated in cloud environments and the complexity of logs generated across disparate cloud environments limit the effectiveness of such log data for identifying and addressing security or performance issues across complex enterprise systems. The availability of data is improved by handling data ingestion separately in each of the various landing zones 220, 230, 250, 260, while using a common basis for each broader group of cloud environments and applications through the associated bases 210 and 240. Consistent data from cloud environments using different cloud service providers is thus logged in the landing zones 220, 230, 250, 260 and filtered in a useable form through the corresponding bases 210 and 240 to the interconnect 204. From there, such data may be analyzed at the network devices 202, and appropriate corrective measures may be implemented as needed. When corrective measures are required, the pattern-based cloud architecture further facilitates such adjustments by allowing changes at the bases 210 and 240 (e.g., updates to base services or operating parameters) that will apply to all their respective landing zones and applications, as well as changes to the landing zones 220, 230, 250, 260 (e.g., updates to landing zone services or operating parameters) that will apply to specific landing zones. Additionally, changes to pattern-based applications may be made to groups of cloud-based applications based upon their pattern types. In some situations, this may allow issues to be fixed for all cloud-based applications having the same type of pattern based upon data indicating problems in only some of such applications, even before the issues appear in other such applications of the same pattern type.

FIG. 3 illustrates a block diagram of an exemplary cloud computing system 300 showing hardware components and communication connections. The various components of the cloud computing system 300 are communicatively connected and configured to support the pattern-based architecture and to implement the methods described further herein. The high-level architecture may include both hardware and software applications, as well as various data communications channels for communicating data between the various hardware and software components. The cloud computing system 300 may be roughly divided into front-end components 302 and back-end components 304. The front-end components 302 may be associated with users, developers, administrators, data sources, and data consumers. The back-end components 304 may be associated with public or private cloud service providers, including departments responsible for enterprise data infrastructure.

The front-end components 302 may include a plurality of computing devices configured to communicate with the back-end components 304 via a network 330. Various computing devices (including enterprise computing devices 312, data repositories 314, or enterprise computing devices 316) of the front-end components 302 may communicate with the back-end components 304 via the network 330 to set up and maintain cloud computing environments, install and run cloud-based applications, provide data to such applications, and receive data from such applications. Each such computing device may include a processor and program memory storing instructions to enable the computing device to interact with the back-end components 304 via the network 330, which may include special-purpose software (e.g., custom applications) or general-purpose software (e.g., operating systems or web browser programs). As illustrated, the wireless computing devices 316 may communicate with the back-end components 304 via a cellular network 320, such as a 5G telecommunications network or a proprietary wireless communication network.

The physical hardware of the front-end components 302 may provide a plurality of software functionalities. Thus, the front-end components 302 may include a plurality of automatic data sources that provide data to the back-end components 304, such as streaming data sources, Internet of Things (IoT) devices, or periodically updating databases configured to push data to one or more cloud-based applications. Additionally or alternatively, the front-end components 302 may include a plurality of accessible data sources that provide data to the cloud-based applications upon request, such as databases, client applications, or user interfaces. Other front-end components 302 may further provide developer or administrator access to the cloud computing assets of the back-end components 304.

The back-end components 304 may comprise a plurality of servers associated with one or more cloud service providers 340 to provide cloud services via the network 330. A first plurality of cloud computing servers 342 may be associated with a first cloud service provider, while a second plurality of cloud computing servers 344 may be associated with a second cloud service provider. Additionally or alternatively, the cloud computing servers 342 and 344 may be distributed across a plurality of sites for improved reliability and reduced latency. The cloud computing servers 342 and 344 may collectively implement various aspects of the methods described herein relating to the pattern-based cloud architecture. As illustrated, the cloud computing servers 342 and 344 may communicate with the front-end components 302 via links 335 to the network 330, and the cloud computing servers 344 may further communicate with the front-end components 302 via links 372 to the cellular network 320. Additionally, the cloud computing servers 342 may communicate with cloud computing servers 344 via the network 330. Individual servers or groups of servers of either the cloud computing servers 342 or the cloud computing servers 344 may further communicate with other individual servers or groups of servers of the same respective cloud computing servers 342 or cloud computing servers 344 may also communicate via the network 330 (e.g., regional server groups of the same cloud service provider located at multiple sites may communicate with each other via the network 330).

Each cloud computing server 342 or 344 includes one or more processors 362 adapted and configured to execute various software stored in one or more program memories 360 to provide cloud services, such as hypervisor software, operating system software, application software, and associated routines and services. The cloud computing servers 342 and 344 may further include databases 346, which may be local databases stored in memory of a particular server or network databases stored in network-connected memory (e.g., in a storage area network). Each cloud computing server 342 or 344 has a controller 355 that is operatively connected to the database 346 via a link 356 (e.g., a local bus or a local area network connection). It should be noted that, while not shown, additional databases may be linked to the controller 355 in a known manner. For example, separate databases may be used for various types of information, for separate cloud service customers in a public cloud, or for data backup.

Each controller 355 includes a program memory 360, a processor 362 (which may be called a microcontroller or a microprocessor), a random-access memory (RAM) 364, and an input/output (I/O) circuit 366, all of which may be interconnected via an address/data bus 365. It should be appreciated that although only one processor 362 is shown for each controller 355, the controller 355 may include multiple processors 362. Similarly, the memory of the controller 355 may include multiple RAMs 364 and multiple program memories 360. Although the I/O circuit 366 is shown as a single block, it should be appreciated that the I/O circuit 366 may include a number of different types of I/O circuits. The RAM 364 and program memories 360 may be implemented as semiconductor memories, magnetically readable memories, or optically readable memories, for example. The controller 355 may also be operatively connected to the network 330 via a link 335.

Some cloud computing servers 344 may be communicatively connected to the cellular network 320 via a communication unit 370 configured to establish, maintain, and communicate through the cellular network 320. The communication unit 370 may be operatively connected to the I/O circuit 366 via a link 371 and may further be communicatively connected to the cellular network 320 via a link 372. In some embodiments, some cloud computing servers 344 may be communicatively connected to the cellular network 320 through the network 330 via the link 335.

The cloud computing servers 342 and 344 further include software stored in their program memories 360. The software stored on and executed by cloud computing servers 342 and 344 performs functions relating to establishing and managing virtual environments, such as managing resources and operation of various cloud computing environments (e.g., virtual machines running operating systems and other software for cloud service customers) in accordance with the pattern-based cloud architecture described herein. Additionally, the software stored on and executed by cloud computing servers 342 and 344 may further include cloud-based applications running in such cloud computing environments, such as pattern-based software applications making use of the pattern-based cloud architecture. Further software may be stored at and executed by controllers 355 of cloud computing servers 342 and 344 in various embodiments.

The various computing devices (e.g., enterprise computing devices 312, data repositories 314, or wireless computing devices 316) of the front-end components 302 communicate with the back-end components 304 via wired or wireless connections of the network 330 and/or via the cellular network 320. The network 330 may be a proprietary network, a secure public internet, a virtual private network or some other type of network, such as dedicated access lines, plain ordinary telephone lines, satellite links, cellular data networks, or combinations of these. The network 330 may include one or more radio frequency communication links, such as wireless communication links with front-end components 302. The network 330 may also include other wired or wireless communication links with other computing devices or systems. Where the network 330 may include the Internet, and data communications may take place over the network 330 via an Internet communication protocol.

Although the cloud computing system 300 is shown to include one or a limited number of the various front-end components 302 and of the back-end components 304, it should be understood that different numbers of any or each of these components may be utilized in various embodiments.

Figure 4A:
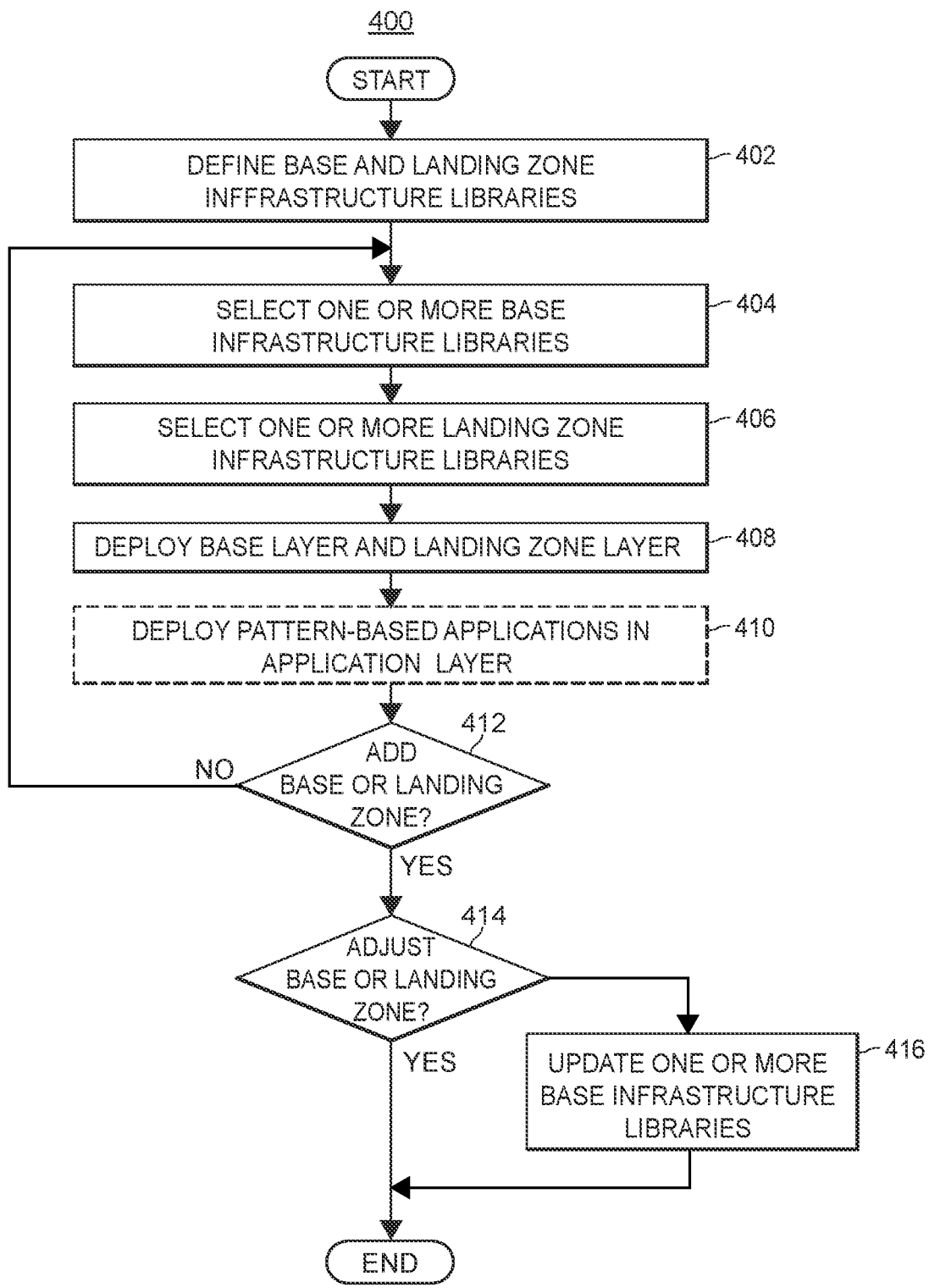
FIG. 4A illustrates a flow diagram of an exemplary pattern-based cloud architecture deployment method according to certain embodiments.

FIG. 4A illustrates a flow diagram of an exemplary pattern-based cloud architecture deployment method 400 according to certain embodiments. The method 400 may be performed in order to develop, deploy, update, and maintain cloud computing environments using a pattern-based cloud architecture comprising a base layer, landing zone layer, and an application pattern layer, as discussed herein. By using infrastructure libraries to define the bases and landing zones, the time required for development and deployment of this pattern-based cloud architecture is reduced, while also ensuring a flexible approach to structuring the cloud environments. With this flexible structure, the development and deployment of pattern-based applications may be likewise improved. Parts of the method 400 may be performed by one or more users (e.g., developers or administrators) controlling enterprise computing devices 312 to set up and manage cloud computing assets of cloud computing servers 342 and 344 associated with one or more cloud service providers 340.

The pattern-based cloud architecture deployment method 400 begins with users defining a plurality of base and landing zone infrastructure libraries to specify services and operating parameters that may be combined to define the system architecture (block 402). After such infrastructure libraries are defined, one or more base infrastructure libraries are selected to define each base (block 404), and one or more landing zone infrastructure libraries are selected for each landing zone of each base to further define such landing zone (block 406). Using the selected infrastructure libraries, each base layer is deployed along with each of its landing zones (block 408). In some embodiments, one or more pattern-based applications may be selected and deployed for some or all of the landing zones (block 410). If it is determined to add one or more additional bases or landing zones at some later point (block 412), the selection and deployment actions of blocks 404-408 (and optionally block 410) are repeated to add such bases or landing zones. Changes to existing bases and landing zones may be made by first determining to adjust a base or landing zone (block 414), then updating one or more infrastructure libraries associated with the bases or landing zones to be adjusted (block 416). The method 400 is exemplary only, and other methods may include additional, fewer, or alternative actions.

At block 402, the process begins with defining a plurality of infrastructure libraries, each of which may be used to partially define the services and operating parameters of bases and landing zones. Each infrastructure library includes one or more operating parameters and/or one or more services, which may be included by reference to further data. For ease of use, the infrastructure libraries may be defined according to function (e.g., communication, security, or compliance), data type (e.g., data sensitivity or restrictions), location (e.g., country or region), or other criteria. In some embodiments, each of the infrastructure libraries may be specified as being either a base infrastructure library or a landing zone infrastructure library. Alternatively, the infrastructure libraries may be defined without such designation, thus allowing any infrastructure library to be used as part of the base infrastructure or as part of the landing zone infrastructure. After being defined, the infrastructure libraries may be stored for later use in designing and deploying bases and landing zones. In some embodiments, the infrastructure libraries may be separate library files stored in one or more network-accessible data storage devices.

At block 404, a user may select one or more previously defined infrastructure libraries to define a base. The user may thus select a set of base infrastructure libraries via a user interface of a computing device, such as by adding the library files to a batch file, by providing input to a cloud architecture management application, or by other means. In some embodiments, a selection software interface or application (e.g., a configuration application running on local or cloud hardware) may validate the one or more selected base infrastructure libraries for conflicts between operating parameters or services. Such a selection software interface or application may further verify any required categories of operating parameters or services have been indirectly selected through selection of base infrastructure libraries defining such elements of the base. Additionally or alternatively, some embodiments may include the selection of one or more default infrastructure libraries defining default operating parameters and services to be used unless preempted by other selected base infrastructure libraries.

At block 406, the user may further select one or more previously defined infrastructure libraries to define a landing zone. The user may select the set of landing zone infrastructure libraries defining the landing zone in a manner similar to that in which the base infrastructure libraries were selected. In some embodiments, a single landing zone infrastructure library may be selected for the landing zone, such that the landing zone infrastructure library (together with one or more base infrastructure libraries) defines an infrastructure pattern for the cloud computing environment of the landing zone. Since the landing zones inherit the base services and operating parameters of the base infrastructure libraries, the landing zone infrastructure libraries may be validated for consistency with the base infrastructure libraries in some embodiments.

At block 408, the base layer and landing zone layer are automatically deployed according to the selected base and landing zone infrastructure libraries. Such automatic deployment may comprise establishing and configuring a cloud computing environment with a specific cloud service provider, such that the cloud computing environment is configured with the operating parameters and services defined in the selected infrastructure libraries. This may be accomplished by implementation of a set of commands for accessing and including the infrastructure libraries or automatically importing the infrastructure libraries into a cloud computing environment during the process of setting up such environment. For example, the user may run a script to automatically import each of the selected infrastructure libraries (e.g., those in a user-specified file or directory) into the cloud computing environment. In this way, the infrastructure libraries facilitate automation of the process of configuring cloud computing environments, as well as ensuring consistency and reducing human error. In some embodiments, confirmation or testing of the cloud computing environment may be automatically performed, such as by running one or more testing and verification scripts upon configuration of the cloud computing environment.

At block 410, in some embodiments, one or more pattern-based applications may be deployed within the cloud computing environment of the landing zone. Such pattern-based applications must meet the functional and operating requirements of the cloud computing environment by matching one of the application patterns associated with the landing zone. One or more pattern-compliant applications may be run within the landing zone to provide data collection, processing, storage, or presentation functions or to provide other cloud-based functionality. In some embodiments, aspects of the operation of such pattern-based applications may be determined by the operating parameters or services of the landing zone within which such applications are running. For example, the data sources available to a pattern-based application running within a landing zone may be determined by one or more base services or landing zone services defined by the infrastructure libraries.

At block 412, the user may determine whether to add an additional base or an additional landing zone. When an addition base is to be added, the actions of blocks 404-410 are repeated for the new base. When an additional landing zone is to be added, the actions of the blocks 404-410 are repeated, but the base infrastructure libraries are retained as having been specified by their previous selection at block 404. Thus, the user may simply indicate the landing zone is part of the existing base (e.g., by copying the set of previously selected base infrastructure libraries or by placing each set of landing zone libraries within a subdirectory within a base directory). If no additional bases or landing zones are currently needed, the method 400 continues with any adjustments to existing bases or landing zones.

At block 414, the user may determine whether to adjust any existing bases or landing zones. Such adjustments may be related to system updates, security patches, changes to data sources or structures, revisions of application patterns, or other changes affecting the operation of one or more cloud computing environments of a landing zone or base. If adjustments are to be made, such changes are facilitated by updating one or more of the infrastructure libraries defining the relevant bases or landing zones, which may involve redefining portions of previously selected infrastructure libraries and/or selecting additional or alternative infrastructure libraries from those previously defined.

Updates and other adjustments to the services or operating parameters may be made at the level of the base layer 110 or at the level of the landing zone layer 120. For example, an update may be indicated by a user for all landing zones associated with a base, such as landing zones 122-1a, b, c associated with a first base 112-1. As an alternative example, the update may be indicated by a user for a set of landing zones meeting specified criteria but associated with different bases, such as Azure Web Apps landing zones 122-1a and 122-2a that are respectively associated with first and second bases 112-1 and 112-2. In some embodiments, an update indication of one or more changes to the base services or operating parameters of a base may be received from a user. Such indication may include selection through a user interface of the changes to be made to the services or operating parameters, which may include adding, removing, or modifying individual services or parameters. Such user selection may be a user selection of one or more infrastructure libraries to be adjusted to effect the update. Upon receiving the indication of the update, appropriate scripts are executed to implement the update across one or more bases and corresponding one or more landing zones.

At block 416, a user may update one or more infrastructure libraries associated with one or more bases or landing zones to implement the adjustments to such bases or landing zones. Updating the infrastructure libraries may include changing the contents of selected infrastructure libraries already associated with the bases or landing zones to be adjusted. Additionally or alternatively, updating the infrastructure libraries may include selecting alternative sets of infrastructure libraries for association with the relevant bases or landing zones (i.e., adding, removing, or replacing infrastructure libraries associated with a base or landing zone). In some such embodiments, additional new infrastructure libraries may be defined for association with the bases or landing zones to be adjusted. Once the infrastructure libraries have been updated, one or more scripts may be run to propagate the changes across the various cloud computing environments by removing, replacing, or adding operating parameters and services indicated by changes to the infrastructure libraries.

In some embodiments, updates to services or operating parameters may be made by executing appropriate scripts to adjust the services or operating parameters across multiple landing zones, either within the same base or across multiple bases. When an update indication is received that indicates updates to base services or operating parameters associated with a base, one or more update scripts are executed to change the base services or operating parameters at the base in order the adjust the cloud computing environments of the landing zones associated with the base. Thus, by configuring the base services and operating parameters of the base, all landing zones associated with the base are updated by their association with the base, without the need to update each landing zone separately. For example, services may be updated for all the landing zones 220 and 230 of a primary base 210 by updating the base services 212, and operating parameters may be similarly updated at the primary base 210 for all the landing zones 220 and 230 associated therewith. In some embodiments, the services or operating parameters may be updated by executing one or more scripts to add, remove, or modify infrastructure libraries associated with a base or landing zone, as discussed above. When no further additions or adjustments to any bases or landing zones are needed, the example method 400 may end.

Figure 4B:
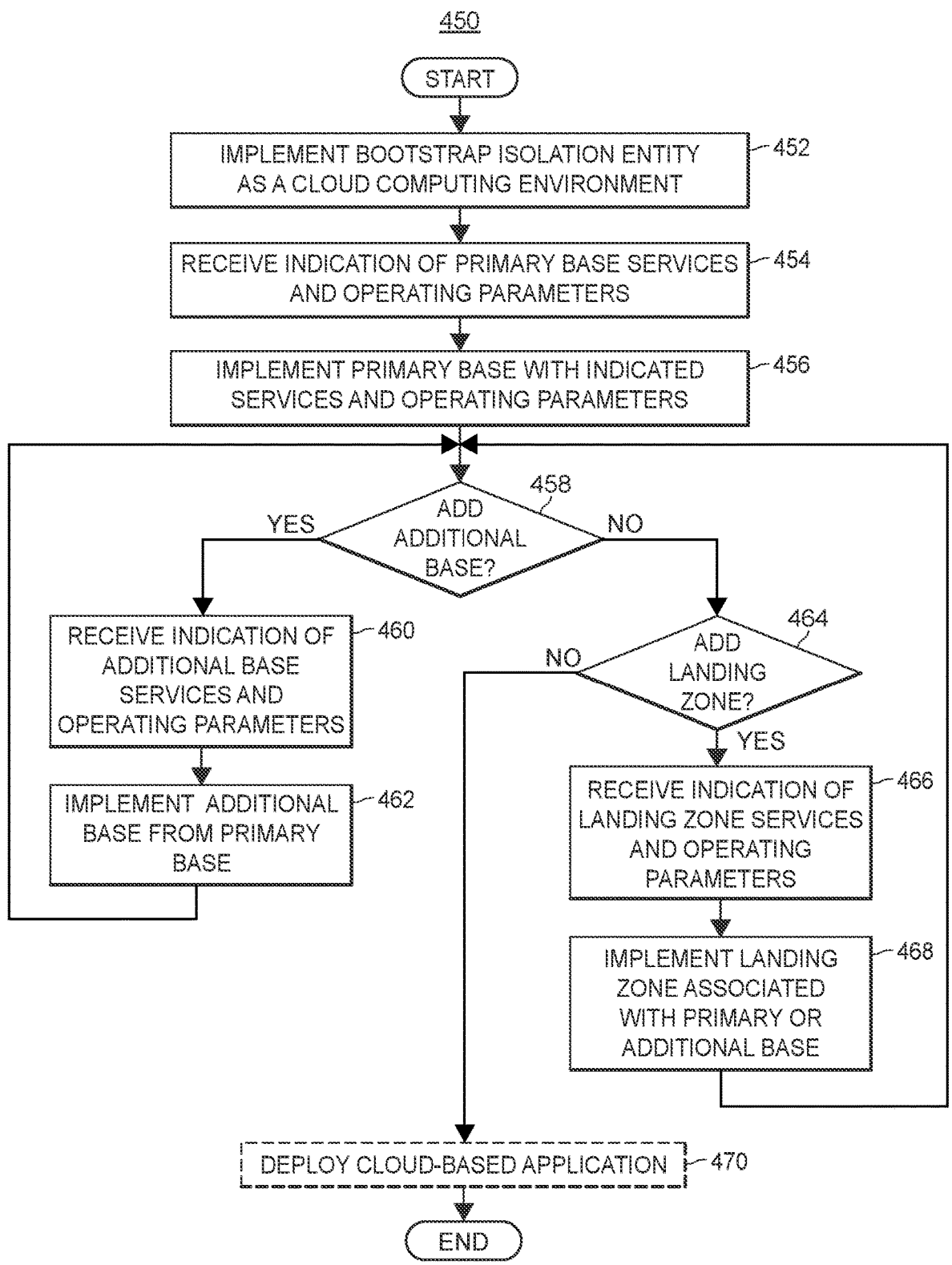
FIG. 4B illustrates a flow diagram of another exemplary pattern-based cloud architecture deployment method according to further embodiments.

FIG. 4B illustrates a flow diagram of another exemplary pattern-based cloud architecture deployment method 450 according to further embodiments. Similar to method 400 discussed above, the method 450 may be performed in order to develop, deploy, update, and maintain cloud computing environments using a pattern-based cloud architecture comprising a base layer, landing zone layer, and an application pattern layer, as discussed herein. In some embodiments, the method 450 may be implemented using infrastructure libraries to define the bases and landing zones, as described above. In other embodiments, the method 450 may be implemented without infrastructure libraries, such as by automatically or manually generated custom scripts or files specifying services and operating parameters associated with bases or landing zones. As illustrated, the method 450 may be used to iteratively define and deploy any number of bases and landing zones, which may be related or unrelated isolation entities within the pattern-based cloud architecture. Although described primarily in terms of initial deployment, it should be understood that parts of the method 450 may be implemented to update bases or landing zones in a manner analogous to initial deployment (e.g., as though the initial base or landing zone were being replaced by a new base or landing zone with changes to services or operating parameters). Parts of the method 450 may be performed by one or more users (e.g., developers or administrators) controlling enterprise computing devices 312 to set up and manage cloud computing assets of cloud computing servers 342 and 344 associated with one or more cloud service providers 340.

The pattern-based cloud architecture deployment method 450 begins with implementing a bootstrap isolation entity as a cloud computing environment from which the system architecture may then be deployed (block 452). One or more indications of primary base services and operating parameters are then received to define a primary base (block 454), and the primary base is implemented with the base services and the base operating parameters (block 456). The method next determines whether an additional base is to be added at this point (block 458). If so, one or more indications of additional base services and operating parameters of an additional base are received from a user to define the additional base (block 460), and the additional base is implemented with such base services and the base operating parameters (block 462). The method then determines whether another additional base is to be added (block 458). When no additional base is to be added, the method next determines whether a landing zone is to be added (block 464). If so, one or more indications of landing zone services and operating parameters of are received from a user to define the landing zone (block 466), which include an indication of a base associated with the landing zone. The landing zone is then implemented with both the base services and operating parameters from the associated base and the indicated landing zone services and operating parameters to define a cloud computing environment (block 468). The method then determines whether another additional base is to be added (block 458) and, if not, whether an additional landing zone is to be added (block 464). When no further bases or landing zones are to be added, in some embodiments, cloud-based software applications may be deployed in one or more landing zones. The method 450 is exemplary only, and other methods may include additional, fewer, or alternative actions.

At block 452, the process begins with implementing a bootstrap isolation entity (i.e., a cloud computing environment from which the primary base within the pattern-based cloud architecture can be deployed). An isolation entity may be an account, project, or subscription identifying a particular set of associated cloud computing environments within the same cloud computing platform provided by a cloud service provider. Such isolation entities are useful in separating data streams or processing between or within organizations, particularly those with high security requirements or legacy technology systems. Each base within the base layer is an isolation entity, and landing zones may be configured as isolation entities in some embodiments. The bootstrap isolation entity is implemented prior to and for the purpose of deploying a primary base of a pattern-based cloud architecture. The bootstrap isolation entity may be established and configured manually by a user or automatically by execution of one or more scripts by a user. In either case, the bootstrap isolation entity is established and configured as a cloud computing environment implemented by cloud service provider according to protocols associated with the cloud service provider.

At block 454, one or more indications of base services and operating parameters defining a primary base are received, either directly or indirectly. The indications of the base services and operating parameters may be entered or selected by a user via a user interface and may include selections of predefined sets of such services and operating parameters (e.g., infrastructure libraries, configuration files, or service files) or may include manually entered service definitions and operating parameter values. The one or more indications collectively define a set of base services and operating parameters for the primary base, which may include any of the services and operating parameters described herein. Such base services may include services enabling each of the one or more landing zones associated with the primary base to perform one or more of the following: monitoring landing zone performance, logging application operations, providing data security, providing shared services, or providing data resiliency. Similarly, the base operating parameters may include parameters defining functional or service level requirements of the cloud computing environments of the one or more landing zones associated with the primary base regarding one or more of the following: security, compliance, authentication, authorization, or data access. In some embodiments, the indications of the set of base services and operating parameters may include user selections of one or more predefined infrastructure libraries, such as by a user interface as discussed above.

At block 456, the primary base is implemented according to the base services and operating parameters to support one or more landing zones as cloud computing environments. In order to implement the primary base, one or more scripts are executed within the bootstrap isolation entity to establish and configure the primary base. The primary base is configured to provide the set of base services and operating parameters, as defined by the one or more indications received at block 454, to each of one or more landing zones that may at any later time be associated with the primary base. Thus, the primary base partially configures the one or more landing zones as cloud computing environments with the base services and operating parameters defining aspects of the cloud computing environments for running cloud-based software applications, such as aspects relating to monitoring, logging, security, shared services, or data resiliency.

At block 458, a determination is made whether to add an additional base. The determination may be made automatically in response to a previously specified indication or manually in response to user input indicating whether an additional base is to be added (e.g., via a user interface of a configuration application running on local or cloud hardware). For example, a predetermined list of bases and landing zones may be referenced to determine whether all bases have been implemented. In some embodiments, the determination of whether to add an additional base may include a determination of whether all landing zones have been implemented for all existing bases, such that new bases are added after all landing zones of existing bases have been implemented. If one or more additional bases remain to be implemented, the method 450 proceeds to receive one or more indications of additional base services and operating parameters at block 460 in order to implement the next base. If no additional bases remain to be implemented, the method 450 proceeds to determine whether any landing zones remain to be implemented at block 464.

At block 460, one or more indications of additional base services and operating parameters defining an additional base are received, either directly or indirectly. The additional base services and operating parameters associated with the additional base may be similar in type to those of the primary base and may include any of the services or operating parameters described herein. As with the primary base, the indications of the base services and operating parameters for each additional base may be entered or selected by a user via a user interface and may include selections of predefined sets of such services and operating parameters (e.g., one or more infrastructure libraries) or may include manually entered service definitions and operating parameter values. In some embodiments, the additional base services and operating parameters may be partially or entirely indicated by reference to the services and operating parameters of the primary base.

At block 462, the additional base is implemented according to the additional base services and operating parameters to support one or more landing zones as cloud computing environments. Similar to the primary base, the additional base may be implemented by executing one or more scripts within the primary base to establish and configure the additional base as a separate isolation entity within the base layer according to the additional set of base services and operating parameters indicated at block 460. In some embodiments, the additional base is configured to provide both the set of base services and operating parameters associated with the primary base and the additional set of base services and operating parameters indicated for the additional base to each of one or more landing zones associated with the additional base. For example, the base services and operating parameters of the additional base may be defined by reference to the primary base, with additional base services and operating parameters (e.g., testing or monitoring services for a development and testing environment).

At block 464, a determination is made whether to add a landing zone to a primary or additional base. As with the determination of whether to add an additional base, the determination of whether to add a landing zone to any of the bases may be automated or manual (e.g., in response to user input received via a user interface). In some embodiments, a landing zone may be determined to be remaining to be added to one or more bases, even if a corresponding landing zone has been implemented for another base. If no landing zones remain to be added to any bases, the method 450 proceeds to deploy one or more cloud-based software applications at block 470 in some embodiments or, alternatively, to end. If one or more landing zones remain to be added to at least one base, the method 450 proceeds to receive one or more indications of landing zone services and operating parameters at block 466 in order to implement the next landing zone.

At block 466, one or more indications of landing zone services and operating parameters partially defining a landing zone associated with a base are received, either directly or indirectly. The one or more indications include an indication of a base associated with the landing zone. In some embodiments, multiple landing zones may be simultaneously specified for different bases by indicating multiple bases and a common set of landing zone services and operating parameters. In such embodiments, the resulting landing zones will be distinct but implement the same landing zone services and operate according to the same landing zone operating parameters, while each inheriting the base services and base operating parameters of their respective bases. In any case, the one or more indications collectively define a set of the landing zone services and landing zone operating parameters for the landing zone, which may include any of the services and operating parameters described herein. For example, the landing zone services may include services relating to security, compliance, monitoring and logging, data access and storage, application management, virtualization or container management, or other functions of the corresponding cloud environments. Similarly, the landing zone operating parameters may define functional or service level requirements of the cloud computing environment of the landing zone regarding one or more of the following: security, compliance, authentication, authorization, or data access. In some embodiments, the indications of the set of landing zone services and operating parameters may include user selections of one or more predefined infrastructure libraries, such as by a user interface as discussed above.

At block 468, the landing zone is implemented as a cloud computing environment according to both (i) the base services and operating parameters of its associated base and (ii) the landing zone services and operating parameters indicated for the landing zone. In order to implement the landing zone, one or more scripts are executed within the corresponding base to establish and configure the landing zone according to the combined set of the base services and operating parameters and the landing zone services and operating parameters. The landing zone is thus configured to operate according to the combined restrictions and requirements of the operating parameters, while providing the combined base services and landing zone services to cloud-computing software applications running within the landing zone. In some embodiments, implementing the landing zone includes establishing a virtual network specific to the landing zone, such as a virtual private network. Thus, all landing zones may be configured to use different virtual networks to further isolate them within or between bases. Thus, the landing zone is implemented as the cloud computing environment according to protocols associated with a cloud service provider to provide to cloud-computing software application one or more functionalities that are specific to the cloud service provider.

At block 470, when no further bases or landing zones remain to be currently added to the pattern-based cloud architecture of the system, one or more cloud-based software applications may be deployed within one or more cloud computing environments associated with landing zones in some embodiments. The cloud-based software applications may be pattern-based applications, as discussed elsewhere herein. As discussed above, within each landing zone, each cloud-based software application has access to the landing zone services of the landing zone and the base services of the base associated with the landing zone, and the landing zone operates according to the operating parameters of both the landing zone and the associated base. Of course, some cloud-based software applications may not use all of the available services or may be restricted from using some of the available services based upon the operating parameters.

Figure 5:
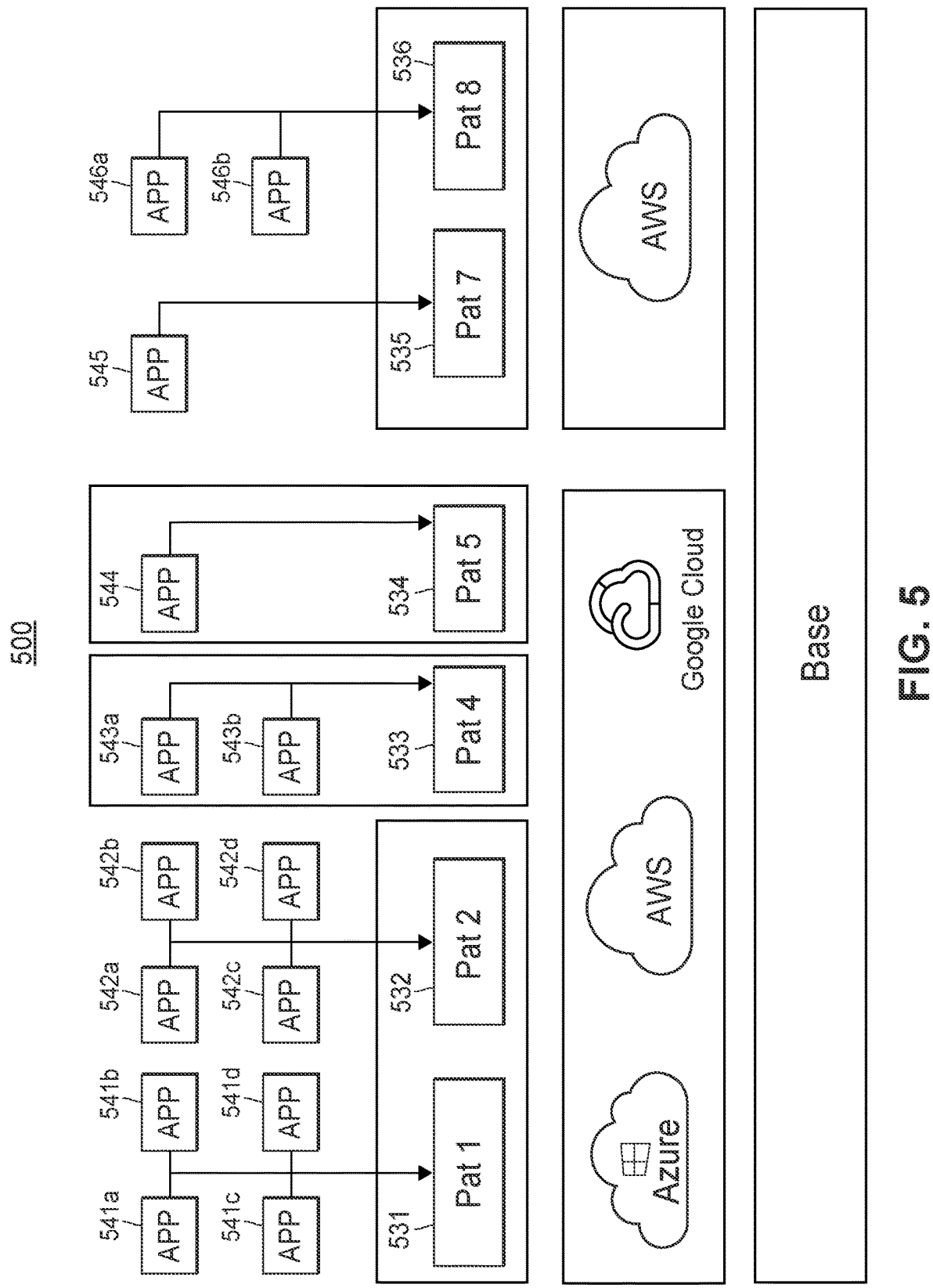
FIG. 5 illustrates a detailed block diagram of the application pattern layer 1 of FIG. 1.

FIG. 5 illustrates a detailed block diagram 500 of the application pattern layer 130 of FIG. 1, further showing the use of application patterns in designing and deploying pattern-based applications in the pattern-based cloud architecture. Similar to FIG. 1, the block diagram 500 includes a base layer 510, a landing zones layer 520, and an application pattern layer 530. The block diagram 500 also includes pattern-based applications 541a-546b that comply with a set of requirements defined in or are implemented within corresponding application patterns 531-536. For example, the application patterns include Pat 1 (ref. no. 531), Pat 2 (ref. no. 532), Pat 5 (ref. no. 533), Pat 5 (ref. no. 535), Pat 7 (ref. no. 535), and Pat 8 (ref. no. 538). Each application pattern 531-536 is assigned to a landing zone (e.g., by an enterprise computing device 312), such that the pattern-based applications 541a-541d assigned the application pattern 531 are configured to run within or access the assigned landing zone. In some implementations, an application pattern may be assigned to more than one landing zone or multiple application patterns may be assigned to the same landing zone. A pattern-based application 541a-541d may be assigned an application pattern 531-536 that is assigned the same landing zone as the pattern-based application 541a-541d. For example, when two application patterns are assigned to a particular landing zone and a pattern-based application is also assigned to the particular landing zone, then the pattern-based application may be assigned one of the two application patterns. The enterprise computing device 312, for example, may select which of the two application patterns to assign to the pattern-based application based on the software resource types of the two application patterns and the type of pattern-based application and/or based on the operating systems of the two application patterns and the operating system for the pattern-based application. The enterprise computing device 312 may select the application pattern having a matching software resource type and/or operating system to the pattern-based application. The software resource types may include virtual machines, containers, websites, databases, data warehouses, streaming services, batch services, application programming interfaces (APIs), etc.

Each application pattern 531-536 includes a set of operating parameters for running the pattern-based applications 541a-546b assigned to the application pattern 531-546. For example, applications 541a-541d are assigned to Pat 1 (ref. no. 531), applications 542a-542d are assigned to Pat 2 (ref. no. 532), applications 543a-543b are assigned to Pat 5 (ref. no. 533), application 545 is assigned to Pat 5 (ref. no. 535), application 545 is assigned to Pat 7 (ref. no. 535), and applications 546a-546b are assigned to Pat 8 (ref. no. 538). In addition to pattern-based applications, other software resources may be assigned application patterns in the cloud computing environment, such as virtual machines, containers, websites, databases, data warehouses, streaming services, batch services, or APIs. Each application pattern 531-536 may be generated for a particular type of software resource. For example, Pat 1 (ref. no. 531) may be the application pattern for virtual machines, Pat 2 (ref. no. 532) may be the application pattern for containers, Pat 5 (ref. no. 533) may be the application pattern for databases, etc. The enterprise computing device 312 may then assign software resources 541a-546b to application patterns 531-536. For example, software resources 541a-546b having a software resource type matching the software resource type of a particular application pattern 531-536 may be assigned to the particular application pattern 531-536.

Each application pattern 531-536 may be configured via a configuration environment executing on an enterprise computing device 312, for example. The configuration environment may include a set of user controls, presented on a user interface of the enterprise computing device 312, for selecting operating parameter values for a set of operating parameters defining the requirements for the application pattern. For each operating parameter, the configuration environment may include a user control for entering an operating parameter value or for selecting an operating parameter value from a set of predetermined choices.

For example, when generating an application pattern, the configuration environment may include the following set of operating parameters for a user to select a corresponding value: a cloud service provider, a type of networking, access restrictions, a hosting service, an operating system, an ingestion service, a query processing service, a domain name system (DNS), a storage type, a configuration type, a patching protocol, a capacity, a level of data security, whether or not to include auto-scaling, a maintenance interval, a high availability (HA) service, an authentication service, a service level indicator (SLI), a recovery point objective (RPO), a recovery time objective (RTO), agents, etc.

In some implementations, a cloud development team may generate each of the layers 110, 120, 130 of the pattern-based cloud architecture 100, while an application developer may generate a pattern-based application which is implemented with the pattern-based cloud architecture 100. For example, a cloud development team may generate the base layer, the landing zone layer, and the application patterns 531 and 532. An application developer may generate the pattern-based applications 541a-542d which are implemented within the application patterns 531 and 532.

In other implementations, a cloud development team may generate some of the layers 110, 120, 130 of the pattern-based cloud architecture 100 while an application developer may generate other layers 110, 120, 130 of the pattern-based cloud architecture 100 and a pattern-based application which is implemented with the pattern-based cloud architecture 100. For example, a cloud development team may generate the base layer, and the landing zone layer. An application developer may generate the application patterns 533 and 534, and the pattern-based applications 543a-544 which are implemented within the application patterns 531 and 532.

In yet other implementations, a cloud development team may generate the base layer 110 of the pattern-based cloud architecture 100. An independent landing zone team may generate the landing zone and application pattern layers 120, 130 of the pattern-based cloud architecture 100, and an application developer may generate a pattern-based application which is implemented with the pattern-based cloud architecture 100. For example, a cloud development team may generate the base layer. An independent landing zone team may generate the landing zone layer and the application patterns 535 and 536. An application developer may generate the pattern-based applications 545-546b which are implemented within the application patterns 535 and 536.

In any event, when a developer creates or migrates a pattern-based application 541a assigned a particular application pattern 531, the enterprise computing device 312 deploys or runs the pattern-based application 541a in a live environment within the particular application pattern 531 and/or within a particular landing zone and base within the cloud. The deployed pattern-based application 541a may then be provided to a wireless computing device 316 for display and/or execution at the wireless computing device 316.

Figure 6:
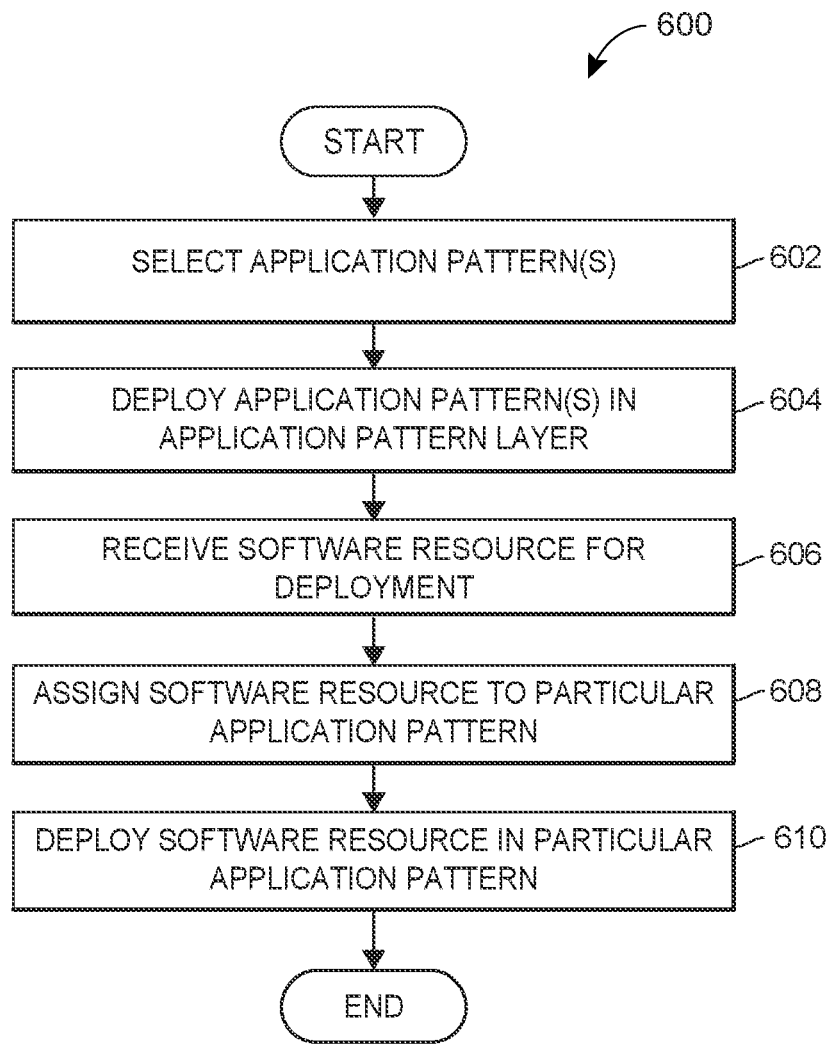
FIG. 6 illustrates a flow diagram of an exemplary method for deploying software resources in a cloud service according to an application pattern.

FIG. 6 illustrates an example method 600 for deploying software resources in a cloud service according to an application pattern, which can be implemented at a computing device. The method can be implemented in a set of instructions stored on a computer-readable memory and executable at one or more processors of the computing device.

At block 602, an application pattern layer is selected. The application pattern may include a set of operating parameters defining aspects of a cloud computing environment. The set of operating parameters may be implemented as IaC, SaC, PaC, TMaC, PiaC, etc. The set of operating parameters may include a set of functional requirements operating parameters, a set of non-functional requirements operating parameters, a set of onboarding process operating parameters, a set of pattern boot process operating parameters, a set of instance boot process operating parameters, a set of deployment model operating parameters, a set of threat model operating parameters, a set of controls operating parameters, a set of compliance rules operating parameters, or any suitable combination of these.

A user, such as a member of a cloud development team, may define the application pattern by selecting operating parameter values via user controls. In other implementations, the user may select previously defined application pattern infrastructure libraries to define an application pattern.

At block 604, the selected application pattern 131 is deployed within an application pattern layer 130 in a cloud service. The application pattern layer 130 includes application pattern(s) 131-138 for type(s) of software resource(s).

At block 606, the enterprise computing device 312 receives a software resource for deployment, such as a pattern-based application and determines the type of software resource. Then the enterprise computing device 312 assigns the software resource to a particular application pattern 131 in the application pattern layer 130 (block 608).

In some implementations, the enterprise computing device 312 may assign the software resource to a particular application pattern 131 when the type of software resource matches the software resource type of the particular application pattern 131. Also in some implementations, the enterprise computing device 312 may assign the software resource to a particular application pattern 131 when the operating system for the software resource matches the operating system of the particular application pattern 131.

Then the enterprise computing device 312 runs or deploys the software resource within the particular application pattern 131 to a live environment in the cloud service (block 610). The live environment may include the particular application pattern 131 from the application pattern layer 130, a landing zone 122-1a corresponding to the particular application pattern 131 from a landing zone layer 130, and a corresponding base 112-1 from a base layer 110.

Figure 7:
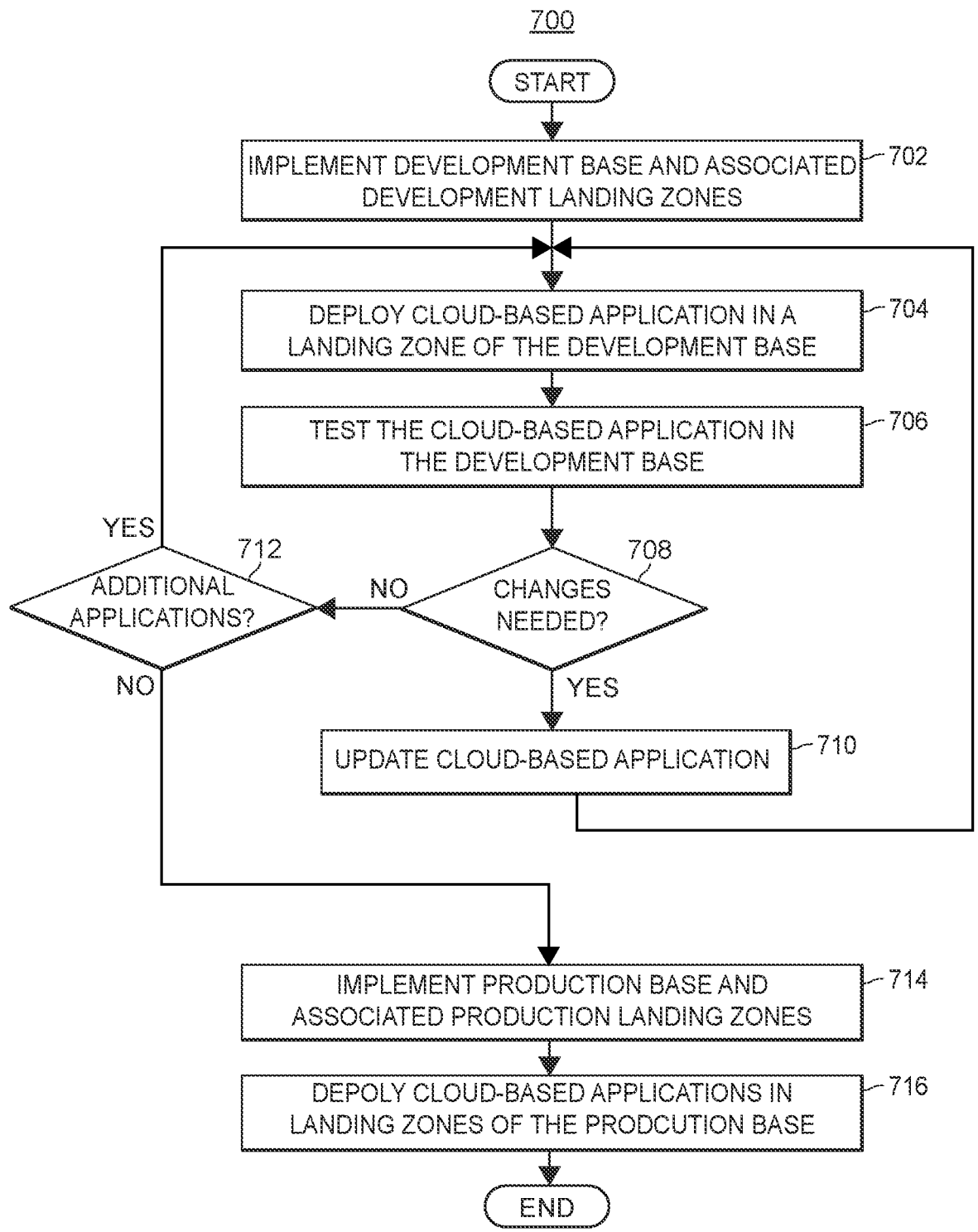
FIG. 7 illustrates a flow diagram of an exemplary development and deployment method using pattern-based cloud architecture to isolate development and production.

FIG. 7 illustrates a flow diagram of an exemplary development and deployment method 700 using pattern-based cloud architecture to isolate development and production. The method 700 may be performed in order to improve the development and testing of cloud-based software applications by using the pattern-based cloud computing architecture described herein to implement a development base and a production base, each having corresponding landing zones. The development base is configured for use as a development and testing environment for cloud-based software applications, while the production base is configured as a live deployment environment for the cloud-based software applications after testing. By implementing corresponding cloud computing environments as landing zones in both the development base and the production base, the cloud-based software applications can be tested under the same conditions as the live production environments. Thus, reliability of testing is improved, and the potential for errors in transferring applications from development and testing environments to live production environments is reduced. Parts of the method 700 may be performed by one or more users (e.g., developers or administrators) controlling enterprise computing devices 312 to set up, manage, and use applications running in cloud computing environments of cloud computing assets of cloud computing servers 342 and 344 associated with one or more cloud service providers 340.

The development and deployment method 700 begins with implementing a development base and associated development landing zones (block 702). A cloud-based software application is then deployed in a development landing zone of the development base (block 704) and tested in the cloud computing environment of the development landing zone (block 706). If changes are determined to be needed to correct errors or otherwise adjust operation of the cloud-based software application (block 708), the application is updated (block 710), and the updated version is deployed in the development landing zone for further testing (block 704). If no changes to the cloud-based software application are determined to be needed (block 708), any additional cloud-based software applications may be similarly tested. If it is determined that there is an additional cloud-based software application to test (block 712), the additional application is deployed in the development landing zone for further testing (block 704). If it is determined that there are no additional cloud-based software applications to test (block 712), a production base and associated production landing zones are deployed for live deployment of the tested applications (block 714). The one or more tested cloud-based software applications are then deployed to the corresponding production landing zones of the production base for use in a live production environment (block 716). The method 700 is exemplary only, and other methods may include additional, fewer, or alternative actions.

At block 702, the process begins with implementing one or more development bases and corresponding development landing zones as cloud computing environments configured for development and testing of cloud-based software applications. The development bases correspond to one or more production bases, being configured with the base services and operating parameters of each corresponding productions base. The one or more development bases also include one or more landing zones matching the landing zones of corresponding production bases. In order to facilitate development and testing, the one or more development bases may be further configured to provide an additional set of base services and operating parameters associated with testing, such as testing services.

At block 704, a cloud-based software application is deployed to one or more of the development landing zones. The cloud-based software application may be a pattern-based application, as described elsewhere herein. Such pattern-based software application may or may not initially match the pattern requirements of each development landing zone in which it is deployed, which may lead to errors detected during testing.

At block 706, the cloud-based software application is tested within the cloud computing environments of the one or more development landing zones in which it was deployed. Such testing may include manual or automated control or interaction with the application in order to detect errors, compatibility issues, or unexpected operation. Special testing services of the development base may be used to perform aspects of such testing or monitor operation of the cloud-based software application within the cloud computing environments of the one or more development landing zones. This may include generating additional data logs of the status of the application or environmental parameters.

At block 708, a determination is made whether changes to the cloud-based software application are needed to correct detected errors, to add functionality, or for other reasons (e.g., improving operating efficiency). In some embodiments, the determination may be made automatically, such as based upon logs of application operations or errors. In alternative embodiments, the determination may be made manually based upon application performance observations or metrics, which may include automatically generated runtime data. If the cloud-based software application passes testing (i.e., if no changes are needed), then the production version of the application is stored for live deployment, and the method 700 proceeds to determine whether any additional cloud-based software applications remain to be tested at block 712. If the cloud-based software application fails testing (i.e., if one or more changes are needed), then the method 700 proceeds to updating the application at block 710, followed by further testing.

At block 710, the cloud-based software application is updated in order to effect the changes determined to be needed. Such updating may be done within a landing zone of the development base, or the application may be modified offline before being updated in the cloud computing environments of the one or more development landing zones. As part of the update, additional or alternative functionality may be added for further testing.

At block 712, a determination is made whether an additional cloud-based software application is to be tested. In some embodiments, the determination may be made using a predetermined list of If one or more additional cloud-based software applications remain to be tested, the method 700 proceeds to deploy the next such application in one or more development landing zones at block 704, as discussed above. If no additional cloud-based software applications remain to be tested, the method 700 proceeds to implement one or more production bases and corresponding production landing zones at block 714.

At block 714, one or more production bases and corresponding production landing zones are implemented as cloud computing environments configured for live deployment of cloud-based software applications that have been previously tested. Such production bases have base services and operating parameters matching those of the corresponding development bases, but without the additional set of base services and operating parameters associated with testing. Additionally, the production bases have landing zones matching some or all of the landing zones of the corresponding development bases. Thus, each landing zone of each production base has the same landing zone services and operating parameters as a corresponding landing zone of the corresponding development base, but the development base may have additional landing zones not currently implemented in the corresponding production base. In some embodiments, one or more of the production bases may have been previously deployed, in which case such existing production bases may be evaluated to confirm a match with the corresponding development bases.

At block 716, the one or more cloud-based software applications that have successfully passed testing as discussed above are deployed in the live production cloud computing environments of the production landing zones. In some embodiments, this may include updating existing cloud-based software applications running in previously deployed product bases, thereby providing tested and stable updates to the existing applications.

Although individual operations of one or more methods are illustrated and described as separate operations, one or more of the individual operations may be performed concurrently, and nothing requires that the operations be performed in the order illustrated. Structures and components presented as separate components in example configurations may be implemented as a combined structure or component. Similarly, structures and components presented as a single component may be implemented as separate components. These and other variations, modifications, additions, and improvements fall within the scope of the subject matter herein.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

What is claimed is:

1. A method for providing a base layer of a cloud-based architecture facilitating deployment of cloud-based software applications, comprising:

receiving, at one or more processors of one or more servers, an indication of a set of base services and operating parameters for a primary base of the base layer, wherein the base services provide connectivity between cloud computing environments of a plurality of cloud service providers;

receiving, at the one or more processors of one or more servers, a further indication of a set of development base services and operating parameters for a development base associated with the primary base, the development base including one or more testing services;

executing, by the one or more processors of the one or more servers, one or more scripts to implement the primary base, wherein the primary base is configured to provide the set of base services and operating parameters to each of one or more landing zones associated with the primary base in order to partially configure the one or more landing zones as cloud computing environments with the base services and operating parameters defining aspects of the cloud computing environments for running cloud-based software applications, wherein each of the one or more landing zones is configured with both the set of base services and operating parameters and a respective additional set of landing zone services and landing zone operating parameters, wherein the primary base is configured as a live deployment base for the cloud-based software applications after development and testing; and executing, by the one or more processors of the one or more servers, one or more further scripts to implement the development base as a separate isolation structure within the base layer according to the set of development base services and operating parameters, wherein the development base is configured for development and testing of the cloud-based software applications.

2. The method of claim 1, further comprising:
establishing, by the one or more processors of the one or more servers, a bootstrap isolation entity prior to implementing the primary base, wherein the bootstrap isolation entity is a configured cloud computing environment implemented by a cloud service provider according to protocols associated with the cloud service provider,
wherein executing the one or more scripts to implement the primary base comprises executing the one or more scripts within the bootstrap isolation entity.

3. The method of claim 1, further comprising:
receiving, at the one or more processors of one or more servers, an additional indication of an additional set of base services and operating parameters for a secondary base of the base layer; and
executing, by the one or more processors of the one or more servers, one or more additional scripts within the primary base to implement the secondary base as a separate isolation entity within the base layer according to the additional set of base services and operating parameters.

4. The method of claim 3, wherein the one or more additional scripts implement the secondary base to provide the set of base services and operating parameters and the additional set of base services and operating parameters to each of one or more landing zones associated with the secondary base.

5. The method of claim 1, further comprising:
receiving, at one or more processors of one or more servers, one or more indications of the respective additional set of landing zone services and landing zone operating parameters associated with each of the one or more landing zones; and
executing, by the one or more processors of the one or more servers, a plurality of scripts to implement the one or more landing zones as the cloud computing environments according to the base services and operating parameters of the primary base and the landing zone services and landing zone operating parameters associated with each respective landing zone.

6. The method of claim 1, further comprising:
receiving, at the one or more processors of the one or more servers, an update indication of one or more changes to the base services or operating parameters of the primary base; and
executing, by the one or more processors of the one or more servers, one or more update scripts to change the base services or operating parameters of the primary base according to the update indication, wherein the primary base is thus configured to provide an updated set of base services and operating parameters to each of the one or more landing zones associated with the primary base.

7. The method of claim 1, wherein the indication of the set of base services and operating parameters comprises a user selection of one or more predefined infrastructure libraries.

8. The method of claim 1, wherein the base services comprise services enabling each of the one or more landing zones to perform one or more of the following: monitoring landing zone performance, providing data security, providing shared services, or providing data resiliency.

9. The method of claim 1, wherein the operating parameters define functional or service level requirements of the cloud computing environments of the one or more landing zones regarding one or more of the following: security, compliance, authentication, authorization, or data access.

10. A computer system for providing a base layer of a cloud-based architecture facilitating deployment of cloud-based software applications, comprising:
one or more processors;
a program memory operatively connected to the one or more processors and storing executable instructions that, when executed by the one or more processors, cause the computer system to:
receive an indication of a set of base services and operating parameters for a primary base of the base layer, wherein the base services provide connectivity between cloud computing environments of a plurality of cloud service providers;
receive a further indication of a set of development base services and operating parameters for a development base associated with the primary base, the development base including one or more testing services;
execute one or more scripts to implement the primary base, wherein the primary base is configured to provide the set of base services and operating parameters to each of one or more landing zones associated with the primary base in order to partially configure the one or more landing zones as cloud computing environments with the base services and operating parameters defining aspects of the cloud computing environments for running cloud-based software applications, wherein each of the one or more landing zones is configured with both the set of base services and operating parameters and a respective additional set of landing zone services and landing zone operating parameters, wherein the primary base is configured as a live deployment base for cloud-based software applications after development and testing; and
execute one or more further scripts to implement the development base as a separate isolation structure within the base layer according to the set of development base services and operating parameters, wherein the development base is configured for the development and testing of the cloud-based software applications.

11. The computer system of claim 10, wherein the indication of the set of base services and operating parameters comprises a user selection of one or more predefined infrastructure libraries.

12. The computer system of claim 10, wherein:
the executable instructions further cause the computer system to establish a bootstrap isolation entity prior to implementing the primary base, wherein the bootstrap isolation entity is a configured cloud computing environment implemented by a cloud service provider according to protocols associated with the cloud service provider,
the executable instructions that cause the computer system to execute the one or more scripts to implement the primary base cause the computer system to execute the one or more scripts within the bootstrap isolation entity.

13. The computer system of claim 10, wherein the executable instructions further cause the computer system to:
receive an additional indication of an additional set of base services and operating parameters for a secondary base of the base layer; and
execute one or more additional scripts within the primary base to implement the secondary base as a separate isolation entity within the base layer according to the additional set of base services and operating parameters, wherein the one or more additional scripts implement the secondary base to provide the set of base services and operating parameters and the additional set of base services and operating parameters to each of one or more landing zones associated with the secondary base.

14. A tangible, non-transitory computer-readable medium storing executable instructions for providing a base layer of a cloud-based architecture facilitating deployment of cloud-based software applications that, when executed by one or more processors of a computer system, cause the computer system to:
- receive an indication of a set of base services and operating parameters for a primary base of the base layer, wherein the base services provide connectivity between cloud computing environments of a plurality of cloud service providers;
- receive a further indication of a set of development base services and operating parameters for a development base associated with the primary base, the development base including one or more testing services;
- execute one or more scripts to implement the primary base, wherein the primary base is configured to provide the set of base services and operating parameters to each of one or more landing zones associated with the primary base in order to partially configure the one or more landing zones as cloud computing environments with the base services and operating parameters defining aspects of the cloud computing environments for running cloud-based software applications, wherein each of the one or more landing zones is configured with both the set of base services and operating parameters and a respective additional set of landing zone services and landing zone operating parameters, wherein the primary base is configured as a live deployment base for the cloud-based software applications after development and testing; and
- execute one or more further scripts to implement the development base as a separate isolation structure within the base layer according to the set of development base services and operating parameters, wherein the development base is configured for development and testing of cloud-based software applications.

15. The tangible, non-transitory computer-readable medium of claim 14, wherein:
- the executable instructions further cause the computer system to establish a bootstrap isolation entity prior to implementing the primary base, wherein the bootstrap isolation entity is a configured cloud computing environment implemented by a cloud service provider according to protocols associated with the cloud service provider,
- the executable instructions that cause the computer system to execute the one or more scripts to implement the primary base cause the computer system to execute the one or more scripts within the bootstrap isolation entity.

16. The tangible, non-transitory computer-readable medium of claim 14, wherein the executable instructions further cause the computer system to:
- receive an additional indication of an additional set of base services and operating parameters for a secondary base of the base layer; and
- execute one or more additional scripts within the primary base to implement the secondary base as a separate isolation entity within the base layer according to the additional set of base services and operating parameters, wherein the one or more additional scripts implement the secondary base to provide the set of base services and operating parameters and the additional set of base services and operating parameters to each of one or more landing zones associated with the secondary base.

17. The tangible, non-transitory computer-readable medium of claim 14, wherein the indication of the set of base services and operating parameters comprises a user selection of one or more predefined infrastructure libraries.

* * * * *